United States Patent [19]

Enos

[11] Patent Number: 5,163,794

[45] Date of Patent: Nov. 17, 1992

[54] SINGLE PLANE ARTICULATED AXIS WORKSLIDE

[75] Inventor: Ellsworth C. Enos, Hold, Mass.

[73] Assignee: Cincinnati Milacron Inc., Cincinnati, Ohio

[21] Appl. No.: 689,181

[22] Filed: Apr. 22, 1991

[51] Int. Cl.⁵ .............................................. B23Q 5/26
[52] U.S. Cl. .................................... 409/221; 269/73; 409/274
[58] Field of Search ............... 409/220, 221, 225, 226, 409/273, 274; 269/73, 91, 111, 156, 208, 20

[56] References Cited

U.S. PATENT DOCUMENTS

| | | | |
|---|---|---|---|
| 2,148,241 | 2/1939 | LaPointe | 409/274 |
| 2,627,196 | 2/1953 | Marsilius | 82/138 |
| 2,782,661 | 2/1957 | Lewis | 87/63 |
| 3,155,383 | 11/1964 | Whitmore | 269/58 |
| 3,347,116 | 10/1967 | Anderson | 77/63 |
| 3,490,430 | 1/1970 | Hoglund | 125/11 |
| 3,554,046 | 1/1971 | Kirk | 74/424.8 |
| 3,572,680 | 3/1971 | Neff | 269/8 |
| 3,581,730 | 6/1971 | Boyd, Jr. | 125/110 CD |
| 3,605,716 | 9/1971 | Kikuchi | 125/11 A |
| 3,665,912 | 5/1972 | Conforti et al. | 125/11 AT |
| 3,841,296 | 10/1974 | Ota | 125/11 PH |
| 3,928,943 | 12/1975 | Wirz | 51/5 D |
| 3,937,110 | 2/1976 | Renoux | 82/25 |
| 4,051,830 | 10/1977 | Gruber | 125/11 R |
| 4,071,015 | 1/1978 | Funke | 125/11 AT |
| 4,159,660 | 7/1979 | Buckley et al. | 82/3 |
| 4,165,661 | 8/1979 | Wasco, Jr. et al. | 82/117 |
| 4,197,769 | 4/1980 | Smith et al. | 82/3 |
| 4,211,512 | 7/1980 | Zankl | 409/221 |
| 4,274,388 | 6/1981 | Ivel | 125/11 TP |
| 4,275,983 | 6/1981 | Bergman | 269/20 X |
| 4,354,796 | 10/1982 | Bergman | 269/20 X |
| 4,399,988 | 8/1983 | DeShong | 269/8 |
| 4,604,833 | 8/1986 | Kimura et al. | 51/165.8 |
| 4,719,676 | 1/1988 | Sansone | 29/27 A |
| 4,763,549 | 8/1988 | Hata et al. | 82/30 X |
| 4,813,311 | 3/1989 | Hebbruggen | 82/117 |
| 4,939,946 | 7/1990 | Teramachi | 74/89.15 |
| 4,961,649 | 10/1990 | Mottate | 384/49 |

OTHER PUBLICATIONS

Mechanisms for Intermittent Motion, John H. Bickford, Industrial Press Inc., N.Y. pp. 209-210.

Primary Examiner—Z. R. Bilinsky
Attorney, Agent, or Firm—Frost & Jacobs

[57] ABSTRACT

An articulated axis workslide assembly having a bridge plate with an upper surface and first and second bridge keyways. The bridge keyways are oriented precisely parallel to one another and a first longitudinal axis, and first and second bridge keys are slidably mounted in respective bridge keyways for reciprocation parallel to the first axis. There is a combination swivel/slide member having a lower surface, a slide keyway and a pivot hole, and a slide key is slidably mounted in the slide keyway. The swivel/slide is slidably and pivotally connected and supported with its lower surface facing the upper surface of the bridge member along a single interface plane. Such connection is preferably provided in part through pivotal connection of the slide key to the first bridge key, and through the slide pivot hole to the second bridge key. Reciprocation of the first and second keys along their respective keyways precisely adjusts both the linear and pivotal position to the swivel/slide member relative to the bridge along the single interface plane.

20 Claims, 4 Drawing Sheets

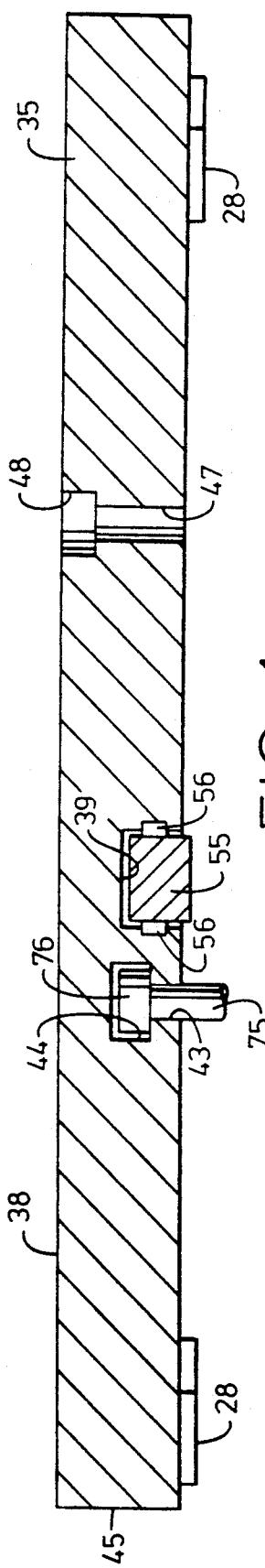
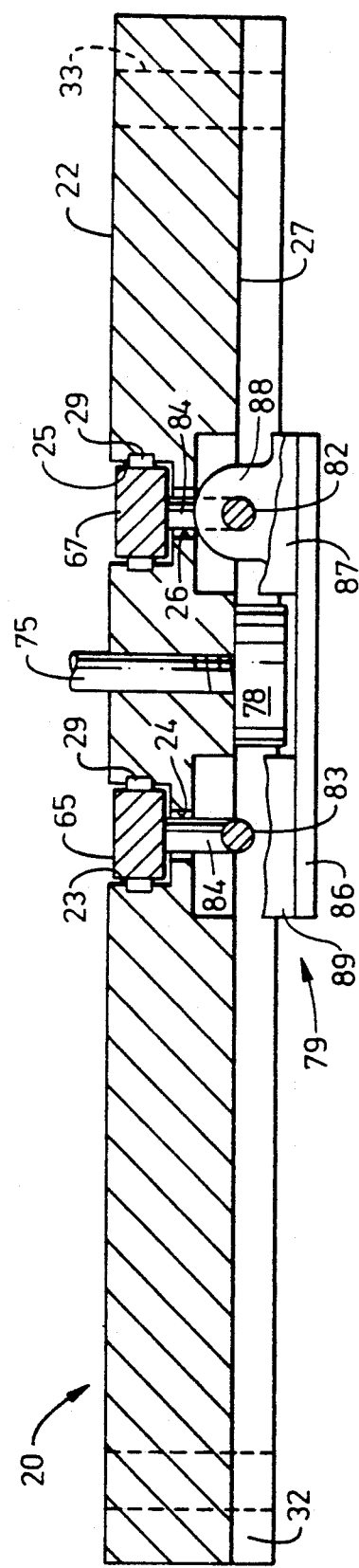

SINGLE PLANE ARTICULATED AXIS WORKSLIDE

TECHNICAL FIELD

This invention relates to what has heretofore been separate, compounded slide motions in various machine and machine tool applications, and, more particularly, to an improved articulated axis workslide which combines separate, compounded slide motions onto a single plane of movement by utilizing a bridge plate, a combination swivel/slide plate, and a series of interrelated keys and keyways to provide multi-axis setup or positioning moves for a machine workhead.

BACKGROUND ART

Machines and machine tools are commonly provided with a series of separate, compounded slide and swivel unit arrangements to provide for multi-axis workslide linear and angular setup or positioning. Such technology corresponds to similar multiple slide/slideway arrangements commonly provided in machine tool devices for feedslide positioning as well. Particularly, very often machines are provided with a base or pedestal upon which a table is fitted for lateral movement along a predetermined axis. Surmounted on that table is generally a second slide or cross-slide provided with a second slideway arrangement for lateral movement along a second axis oriented normal to the first axis.

An example of common multiple slide/slideway arrangements is shown in U.S. Pat. No. 4,165,661 (which issued to A. Wasco, Jr. et al.). Wasco et al. show a machine tool comprising a bed having a pair of parallel ways fixed to the face of the bed upon which a slide is mounted for reciprocation along a horizontal path. That slide has an upper face upon which a second set of parallel ways support a second slide which provides reciprocable movement along a path normal to the first horizontal path. Other U.S. patents illustrating similar multiple slide/slideway arrangements include U.S. Pat. No. 2,627,196 (Marsilius), U.S. Pat. No. 3,347,116 (Anderson et al.), U.S. Pat. No. 3,928,943 (Wirz), U.S. Pat. No. 3,937,110 (Renoux), U.S. Pat. No. 4,159,660 (Buckley, et al.), U.S. Pat. No. 4,197,769 (Smith et al.), U.S. Pat. No. 4,719,676 (Sansone), and U.S. Pat. No. 4,813,311 (Hebbruggen).

Similarly, it is common to provide for multi-axis adjustment of a machine workslide by providing multiple slide/slideway arrangements. For example, U.S. Pat. No. 3,841,296 (which issued to H. Ota) describes a dressing device having a feeding table slidable on a guide surface as a result of rotative movement of a feedscrew. A traverse table is associated with and surmounts the feeding table in a slidable arrangement including a dovetail groove for movement therealong. U.S. Pat. No. 3,490,430 (which issued to N. Hoglund) illustrates an apparatus incorporating a complicated combination of a plurality of slides utilized to control the movement of a tool for dressing a grinding wheel.

U.S. Pat. No. 4,274,388 (which issued to L. Ivel) and Pat. No. 4,071,015 (which issued to M. Funke) illustrate grinding wheel dressing devices which utilize a combination of slide/slideway structures and guide cam arrangements. Particularly, the Ivel device includes a wheel dressing assembly having a carriage moved along a linear track by a drivescrew setup, while a separate tool slide is moved in a direction transverse to that carriage by a cam and cam follower assembly. The wheel dressing device of Funke includes a cross-slide guided on dovetail ways on the dresser base, and a transversely arranged set of dovetail ways for supporting a diamond bar as it is reciprocated by the cam bar/support interaction.

U.S. Pat. No. 4,763,549 (which issued to Y. Hata, et al.) discloses a machine tool wherein a pair of tool heads are supported on tool slides powered by feedscrews, and wherein the tool slides are moved in a second, normal direction by a servo motor attached to a second slider mechanism carried upon a separate set of ways. Such multiple-axis workslide and feedslide arrangements require additional space and machine structure to accommodate the piggy-backed or layered arrangement of slides and slideways, and require multiple joints of loading which must be independently supported.

In most modern day machining applications, machine stability and accuracy are critical to achieving superior products, and simplicity, compactness, reliability, and durability of the machine likewise comprise critical characteristics which must be optimized. The need for multiple load-bearing joints characteristic of the multiple tier feedslides and workslides mentioned above, adds complexity to the machine, compromising ease of manufacture, maintenance, design, reliability, stability and durability. In addition to requiring substantial redundant machine structure to support independent load-bearing slide arrangements, these independent mechanisms can further result in cumulative backlash, and more complicated design, manufacture and assembly.

Accordingly, heretofore there has not been available in the industry a relatively simple articulated axis workslide which could provide dependable, stable, multi-directional lateral motion in a mechanism which could be easily adapted to a substantially unlimited array of machine and machine tool applications. Prior art workslide devices required a plurality of separate slides and ways to accomplish omni-directional lateral motion, or utilized compounded slide and swivel units, racks and curved gears to achieve linear and angular positioning, thereby increasing the required complexity and, generally, the size of the machine, while reducing its resulting stability, accuracy, reliability and dependability.

DISCLOSURE OF THE INVENTION

It is an object of this invention to overcome the above-described problems and shortcomings of the workslide arrangements previously available in the industry.

It is another object of the present invention to provide a compact and simple articulated axis workslide which provides reliable multi-directional motion on a single plane of support.

It is also an object of the present invention to provide an improved articulated axis workslide which enables compression of motion of the device for increased rigidity and elimination of multiple mechanisms previously required.

It is yet another object of the present invention to provide precise linear and pivotal positioning of a machine workhead in a simple and compact workslide which operates along a single load bearing plane.

It is also an object of the present invention to provide an improved single plane articulated axis workslide which can be easily adapted to a wide variety of machine and machine tool applications.

In accordance with one aspect of the present invention, there is provided an articulated axis workslide assembly comprising a bridge plate having an upper surface and first and second bridge keyways. The bridge keyways are oriented precisely parallel to one another along a first longitudinal axis. First and second bridge keys are slidably mounted in the first and second bridge keyways for reciprocation parallel to the first axis. A combination swivel/slide member is provided having a lower surface, a slide keyway and a pivot hole, and a slide key is slidably mounted in the slide keyway. The bridge is slidably and pivotally connected and supported such that its upper surface is adjacent and facing the lower surface of the slide member along a single interface plane. The connection of the bridge and swivel/slide member is provided in part by a rotatable attachment of the swivel/slide adjacent its pivot hole to the second bridge key. Reciprocation of the first and second keys along their respective keyways precisely adjusts the position of the swivel/slide member relative to the bridge in both lineal and radial directions along the single interface plane.

In a preferred embodiment, the assembly further includes one or more locking devices for selectively locking the combination swivel/slide member in a desired position relative to the bridge plate. To provide this selective locking mechanism, a clamp member may extend through a slot formed in the bridge and into an arcuate slot formed in the swivel/slide. The swivel/slide member will also be supported for rotatable movement along the single interface plane by a frictionless bearing arrangement between the bridge and swivel/slide.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

FIG. 4 is a vertical cross-sectional view of the combination swivel/slide member shown in FIG. 3, taken along line 4—4 thereof;

FIG. 5 is a vertical cross-sectional view of the bridge plate of FIG. 3, taken along line 5—5 thereof;

DETAILED DESCRIPTION OF THE INVENTION

Figure 2:
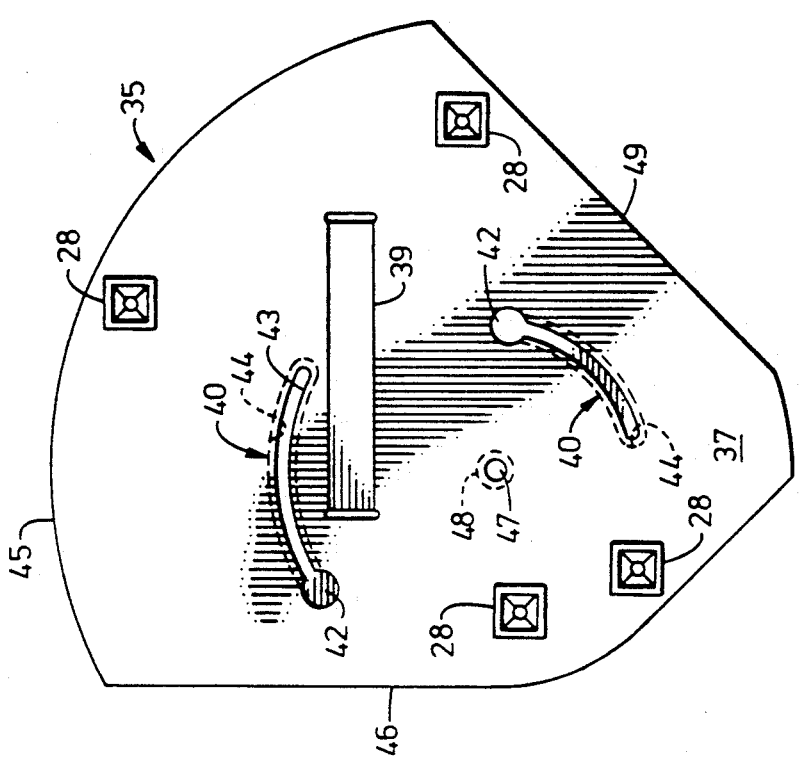
FIG. 2 is a bottom plan view of a combination swivel/slide member of an articulated axis workslide assembly of the present invention.
Figure 1:
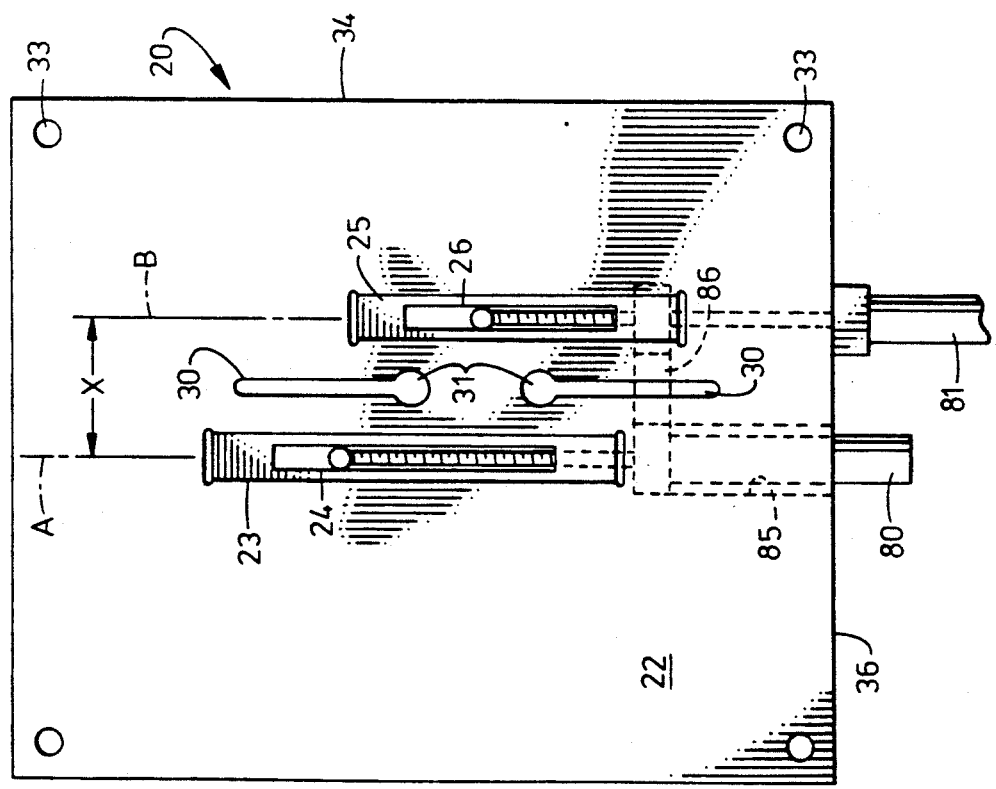
FIG. 1 is a top plan view of a bridge plate member of an articulated axis workslide assembly of the present invention.

Referring now to the drawings in detail, wherein like numerals indicate the same elements throughout the views, FIG. 1 is a top plan view of a bridge plate 20 of an articulated axis workslide assembly 15 of the present invention. FIG. 2 illustrates a bottom plan view of a preferred combination swivel/slide member 35 of an articulated axis workslide assembly 15, and an exploded view of the assembly of bridge plate 20 and combination slide 35 is best illustrated in FIG. 3.

Turning to the specifics of bridge plate 20 shown in FIG. 1, an upper surface 22 includes a pair of first and second rectangular keyways (23 and 25, respectively), which are formed in surface 22 precisely parallel to one another and longitudinal axes A and B, respectively. As seen best in FIG. 5, keyways 23 and 25 do not extend completely through the thickness of bridgeplate 20, but are formed with lesser through-slots 24 and 26, respectively. Particularly, slots 24 and 26 extend along a portion of first and second keyways 23 and 25, respectively. Keyways 23 and 25 are also spaced from one another at a predetermined distance X, as illustrated, and can have a longitudinal length adapted to correspond with machine application requirements. It has been found that forming keyway 23 with a length of between about 7 and 9 inches (between about 17.8 and 22.8 cm), and keyway 25 with a length of between about 3 and 5 inches (between about 7.6 and 12.7 cm) provides sufficient linear stroke to accommodate most machine swivel requirements. The actual lengths may, of course, vary between applications.

Lower surface 27 of bridge plate 20 may include a pair of longitudinally extending bridge mounting ribs 32 which effectively provide a recessed portion of lower surface 27. Alternative mounting setups, such as well known machine base-integral and machine base-attached bridge cheeks, could be equally substituted, as desired. A first key 65 will be slidably mounted in first bridge keyway 23 for reciprocation parallel to axis A, and, similarly, a second bridge key 67 will be slidably mounted in second bridge keyway 25. As seen best in FIGS. 3 and 5, means 79 for selectively reciprocating first and second bridge keys 65 and 67 can be provided in the form of manipulators 80 and 81. Means 79 for reciprocating these keys could comprise a wrench, handwheel, or servo or stepping motor motivators, as illustrated generally in the form of manipulators 80 and 81.

Figure 3:
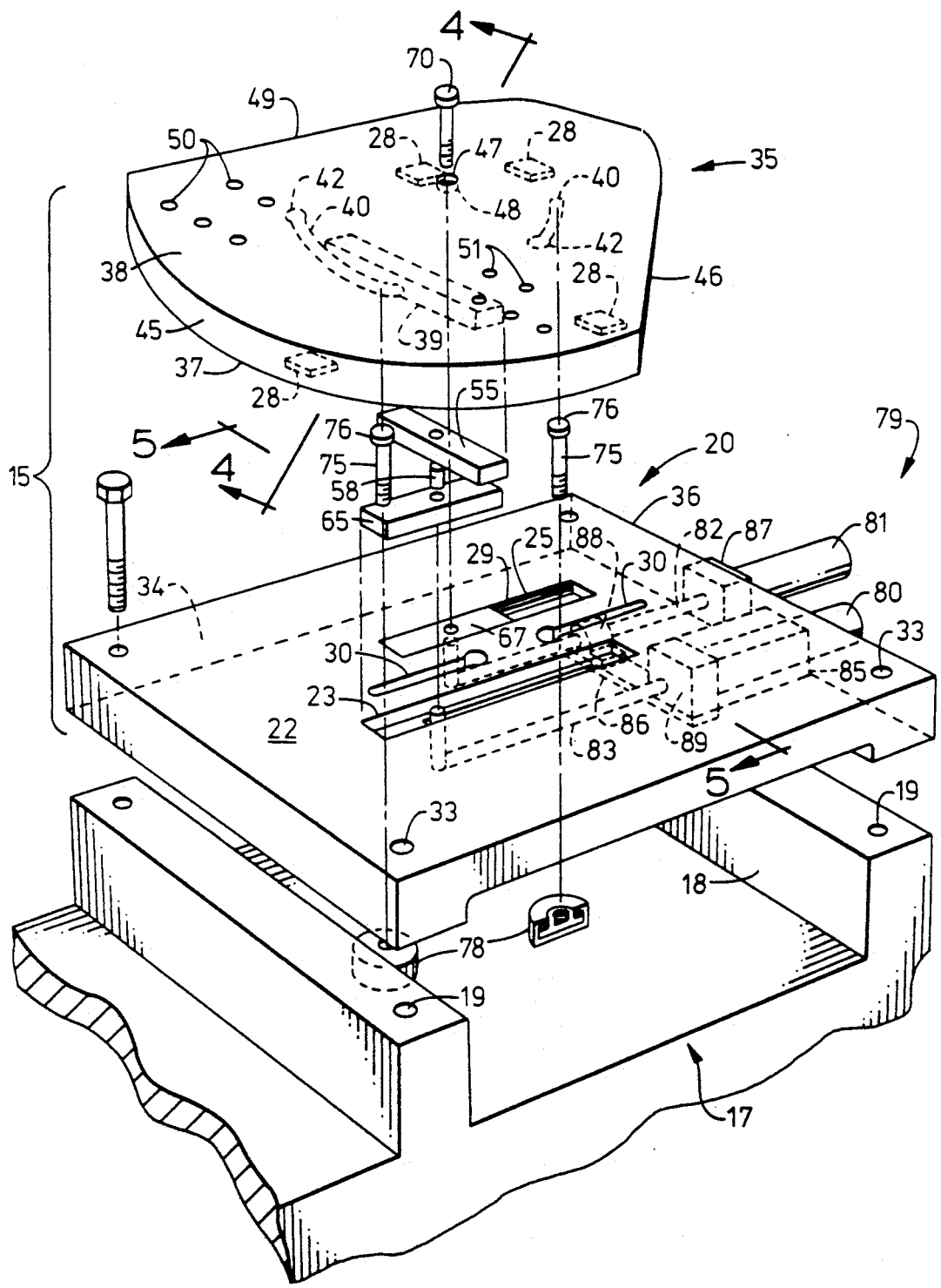
FIG. 3 is an exploded perspective assembly view of an articulated axis workslide of the present invention, illustrated with a machine base to which it might be attached.

As illustrated in FIGS. 1 and 3, manipulator 81 may be anchored on bridge 20 and directly connected to bridge key 67, such as via a ballscrew, acme screw, worm drive hydraulic cylinder, or similar arrangement, link arm 82, and link pin 84. Manipulator 81 might preferably comprise a non-rotating ballscrew arrangement, whereby rotational energy is transformed in ballscrew nut housing 87 into linear movement applied via arm 82.

Manipulator 80 has been non-rotatably, reciprocably mounted within a recess 85 formed in bridge 20, and similarly directly connected to bridge key 65 via a link arm 83 and link pin 84. Manipulator 80, however, is also rigidly fixed to move with bridge key 67 (such as by the rod clamp 88 and tie plate 86 connected to link arm 82 and key 67), whereby manipulator 80 and bridge key 65 are simultaneously moved along linear axis A with bridge key 67. Consequently, manipulator 81, when actuated, simultaneously moves both bridge keys 65 and 67 linearly along their respective keyways (25 and 28) to linearly reposition swivel/slide 35, as will be seen.

Floating manipulator 80, on the other hand, enables independent reciprocation of bridge key 65 relative to bridge key 67, to induce rotational repositioning of swivel/slide 35. It may be preferred to similarly provide manipulator 80 in the form of a stepping motor and ballscrew/nut arrangement, wherein rotational energy can be transformed into linear movement of link arm 83 via ballscrew housing 89. While simultaneous movement of keys 65 and 67 could be accomplished by synchronized actuation of two separate manipulators (e.g., hand cranks or stepping motors anchored to bridge 20), it is preferred to provide the floating manipulator 80 as described above to avoid a need for such synchronized control. As will be appreciated, any means for reciprocating bridge keys 65 and 67 along their respective keyways 23 and 25 could be utilized.

FIG. 1 also illustrates a pair of casually machined slots 30 in bridge 20 having enlargements 31, which may be provided to enable the selective locking of workslide assembly 15 in a desired position. These locking devices will be explained in greater detail below. Mounting bores 33 are provided to facilitate anchoring of bridge plate 20 to a machine base 17 or the like, as illustrated in FIG. 3. Particularly, base 17 is shown as including a pair of spaced upstanding bridge cheeks 18 having anchoring bores 19 corresponding with bores 33.

A plurality of anti-friction support media or pockets 28 are illustrated for providing a substantially frictionless bearing arrangement between upper surface 22 of bridge plate 20 and the lower surface 37 of combination swivel/slide 35, as will be described herein. This frictionless bearing arrangement can comprise an airlift setup, a hydrostatic arrangement, or other bearing arrangement.

In a preferred embodiment, anti-friction support media 28 comprises a plurality of hydrostatic bearings (e.g., fluid bearings such as oil or air hydrostatic devices) arranged in spaced relationship on lower surface 37 of swivel/slide 35, and which can be selectively actuated whenever a positioning move of workslide assembly 15 is desired. Such selectively actuatable frictionless bearing support is preferable so that relative movement between swivel/slide 35 and bridge plate 20 is only facilitated when such movement is desired, and avoided when these elements are to be locked in a desired position. Additionally, location of the anti-friction media on lower surface 37 insures that the moving swivel/slide 35 will always be properly supported, and that such media will remain covered and at least partially isolated from ambient influences such as dirt, dust and debris.

FIG. 2 illustrates the bottom surface 37 of combination swivel plate or slide 35. As illustrated, a preferred combination swivel/slide 35 would include a curved upper peripheral edge 45 bounded by longitudinal edges 46 and 49, respectively. A precision machined slide keyway 39 is formed in combination slide 35 to slidably receive a slide key 55 (as best seen in FIGS. 3 and 4). While slide keyway 39 is shown as generally oriented substantially normal to longitudinal edge 46, the exact angle and location of slide keyway 39 is not critical. A pivot hole 47 is provided for pivotally connecting swivel/slide member 35 to key 67 with its lower surface 37 oriented downwardly and facing upper surface 22 of bridge plate 20 in assembled condition. The exact location of pivot hole 47 on combination swivel/slide 35 is not critical to the function of the workslide assembly of the present invention.

A pair of casually machined and located arcuate tee slots 40 are also provided in combination swivel/slide 35 for use in connection with a preferred means for selectively locking swivel/slide 35 in desired position relative to bridge plate 20. Slots 40 include enlargements 42, slot walls 43 having a predetermined width, and enlarged slot portions or flanged recesses 44 providing the "T" cross-section of tee slots 40, as best illustrated in FIG. 4 As mentioned above, a plurality of anti-friction devices 28 are spaced along lower surface 37 as well.

As shown in FIG. 3, combination swivel/slide member 35 is inverted with its lower surface 37 oriented downwardly for assembly with bridge plate member 20. In assembled condition, slide key 55 is slidably mounted within slide keyway 39, and is preferably rotatably connected (such as via rotatable connector 58) to first bridge key 65, which is slidably mounted in keyway 23. Such arrangement thereby establishes partial connection, location, and orientation of swivel/slide 35 relative to bridge plate 20. In a preferred arrangement, a pair of locking members or shafts 75 having T-shaped heads 76 are slidably inserted into enlargements 42 for reciprocation along respective tee slots 40. As seen best in FIG. 4, the T-head 76 of a shaft 75 slidably fits within the enlarged recesses 44 of slots 40, and cannot be vertically withdrawn therefrom except through enlargements 42.

The lower ends of shafts 75 are aligned through respective lock slots 30 in bridge plate 20 as slide 35 is lowered onto upper surface 22 of bridge 20. Pivot pin 70 pivotally and rotatably connects swivel/slide 35 to second bridge key 67 through pivot hole 47. By virtue of its slidable connection within second keyway 25, second bridge key 67 completes both the assembly of swivel/slide 35 to bridge plate 20, and the location and orientation of swivel/slide relative to bridge plate 20. In a preferred arrangement, pivot pin 70 is connected to second bridge key 67, and provides the primary linearly adjustable pivot for slide 35 relative to bridge 20. A counter-sunk recess 48 is provided to accommodate an enlarged head of pivot pin 70. As mentioned, connection of swivel/slide 35 to bridge 20 is also provided by a secondary pivotal connection (e.g., connector 58) of slide key 55 and first bridge key 65.

As best seen in FIGS. 3 and 5, the lower ends of locking shafts 75 are received within "floating lock" clamps 78, which can be selectively actuated to lock swivel/slide 35 in desired pivotal and slidable relationship relative to bridge plate 20. In operation, locking clamps 78 can alternately be selectively released to allow substantially unencumbered movement between slide 35 and bridge plate 20, and activated as desired to provide vertical clamping force to substantially immovably hold slide 35 against bridge plate 20. The clamps 78 automatically find their own clamping position during repositioning of swivel/slide 35 as a result of the corresponding "scissor" action of the slots. Releasable locking devices or clamps 78 can comprise a hydraulic cylinder, wherein the hydraulic piston (e.g. 73) is attached to shaft 75. Downward movement of the piston tightens swivel/slide 35 against bridge 20, while upward movement releases such tension to permit movement.

As illustrated in FIGS. 4 and 5, keys 55, 65 and 67 can be slidably mounted within their respective keyways within anti-friction supports such as bushings or thrust bearings 56, and 29 respectively. First and second bridge keys 65 and 67 are, in turn, preferably connected through link pins 84 to means 79 for reciprocating keys 65 and 67 longitudinally along axis A. It is contemplated that an articulated axis workslide assembly 15 will be connected (such as via mounting bores 33) to a machine base 17 or mounting surface thereon, and that a workhead or similar device may be attached to articulated axis workslide 15 (such as via mounting holes 50 or 51).

Figure 6:
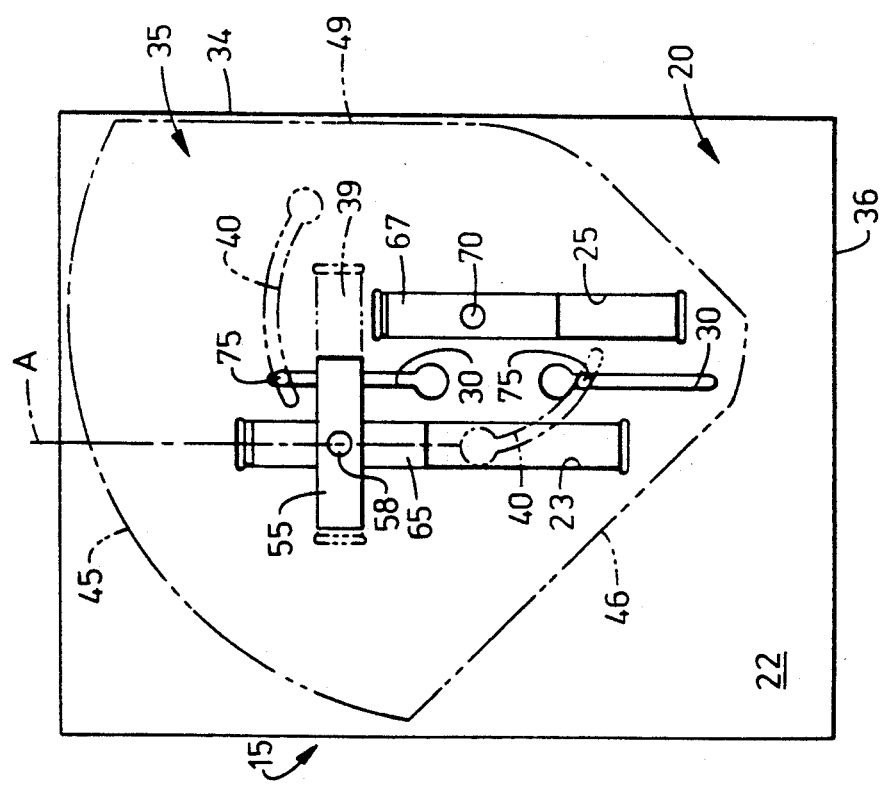
FIG. 6 is a plan view of an articulated axis feedslide assembly shown in assembled condition, and illustrated schematically to show the key/keyway arrangement and floating lock members.

FIG. 6 illustrates schematically the location and movement of keys 55, 65 and 67, as well as locking shafts 75. Particularly, FIG. 6 illustrates combination swivel/slide 35 shown pivoted approximately 45 degrees clockwise to its rear-most position, wherein longitudinal edge 49 is substantially parallel to the longitudinal edge 34. While the workslide assembly of the present invention could be configured to enable varying degrees of rotational limits, it has been found that about 45 degrees of pivotal motion of swivel/slide 35 is the maximum amount easily attainable without encountering structural problems with the various interacting keyways, slots, keys, clamps, and pivots.

FIG. 6 is schematic in that it shows the key/keyway structures which will be concealed between bridge 20 and swivel/slide 35 in use. As can be seen, slide key 55 is rotatably connected to first bridge key 65 by connector 58 in a scissors-like arrangement. Slide key 55 seeks its own lateral position within keyway 39, as well as seeking its own angular position in relation to bridge key 65, which is reciprocated along keyway 23.

Second bridge key 67 is illustrated as carrying the primary pivot for combination swivel/slide 35 (i.e., pivot pin 70 located within pivot hole 47). As discussed above, first key 65 and second key 67 are preferably reciprocated by a means 79, such as manipulators or stepping motors 80 and 81. It is preferred that the manipulators 80 and 81 will be linked to bridge keys 65 and 67, respectively, in an independent manner so that precise reciprocation of each key can be accomplished independently if desired. If both manipulators 80 and 81 are power operated devices (e.g., servo or stepping motors), a control unit (not shown) could also be utilized to provide manipulation signals to precisely control the relative linear and angular position of swivel/slide 35 with respect to bridge plate 20.

Locking shafts 75 can "float" within the respective interacting slots 30 and 40 as swivel/slide 35 is relocated linearly or pivoted with respect to bridge 20, and once swivel/slide 35 is manipulated to a desired position relative to bridge 20, locking clamps 78 can be actuated to hold assembly 15 in that position. Locking clamps 78 would, of course, be released to allow shafts 75 to "float" within interacting slots 30 and 40 during all linear and pivoting movement of swivel/slide 35 relative bridge 20.

Either or both of the manipulators 80 and 81 can be actuated to appropriately longitudinally reciprocate keys 65 and 67, respectively, in order to traverse or rotate swivel/slide 35 to a desired position. As described above, a preferred embodiment will have one manipulator (e.g. 81) functionally tied to key 67, and the other manipulator (e.g., 80) supported for movement with key 67 and functionally tied to key 65, to enable combined linear and independent rotational movement of swivel/slide 35. Particularly, activation of manipulator 81 will control all linear movement along axis A, while manipulator 80 will enable independent rotation of swivel/slide 35.

Figure 7:
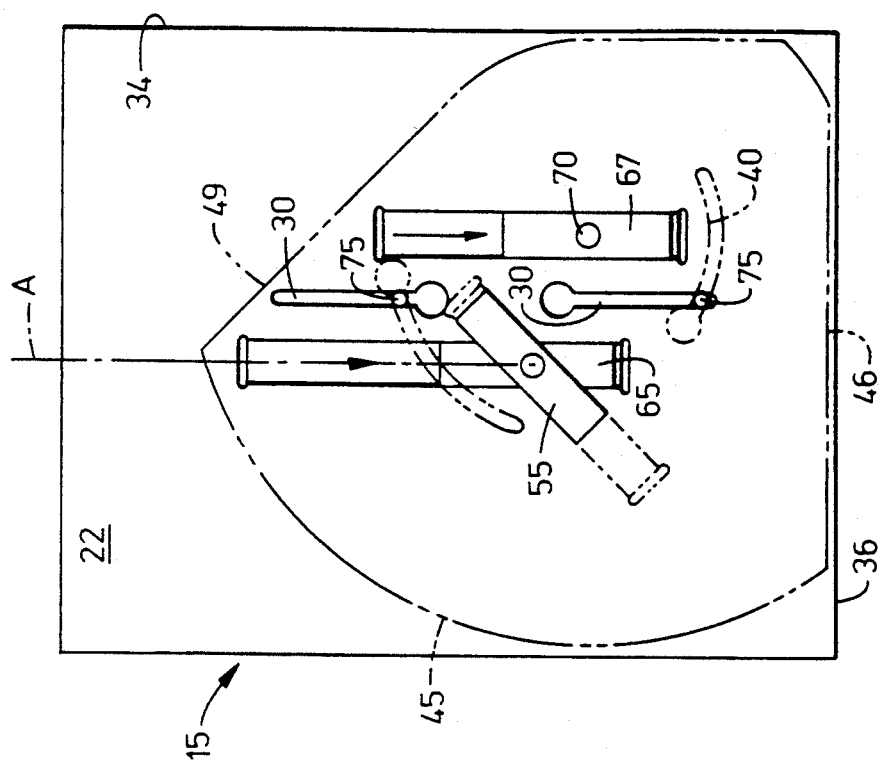
FIG. 7 is a schematic plan view similar to that of FIG. 6, illustrating the linkage movement of the keys for articulation of the combination swivel/slide member relative to the bridge plate.

FIG. 7 shows the workslide assembly 15 with swivel/slide 35 relocated to its combined limits of counterclockwise swivel and forward-most linear positions, with its longitudinal edge 46 substantially parallel and adjacent transverse edge 36 of bridge plate 20. As can be appreciated by comparing FIGS. 6 and 7, rotation of swivel/slide 35 in the forward (i.e., downward) and counterclockwise directions has been accomplished by longitudinal downward movement of both keys 65 and 67, with a longer downward stroke of key 65 to also accomplish movement of slide key 55 in a rearward direction. As will be understood, locking shafts 75 have moved downwardly within slots 30, and have also been moved along arcuate slots 40 to accommodate the rotation and forward linear movements of combination swivel/slide 35.

It should be apparent that movement of combination swivel/slide 35 within the mechanical limits of linear and rotatable movement relative to bridge 20 can be accomplished by appropriate reciprocation of first and second bridge keys 65 and 67. As mentioned, the rotation of slide 35 has been limited to about 45° in the embodiment shown in FIGS. 6 and 7, only as a preferred example. Moreover, all of such movement is accomplished along a single plane of support between bridge 20 and combination swivel/slide 35, with such movement being facilitated by anti-friction support devices 28.

The structure of the present assembly also simplifies the linear and rotational control of the positioning of swivel/slide 35 by eliminating a need for laborious calculations of swivel angles for desired positions. Moreover, the need for complex, costly, and precisely machined rack and pinion arrangements, curved gears, and/or worm drives generally required for manual or powered workhead swivel is obviated. Particularly, the spacing distance X between keyways 23 and 25 is predetermined and constant. Consequently, simple multiplication of the tangent of the desired swivel angle by the distance X determines the necessary linear movement of bridge key 65 relative to bridge key 67 required to achieve that angle. This movement can then be accomplished by manual or automatic adjustment.

The required linear movement of bridge key 65 can be quickly calculated, such as by reading from a Tan/0–45 degree chart, and implemented manually by monitoring an included readout scale; or alternatively, can be completed by machine software following entry of the desired angular change. This allows even further adaptability of the present invention to a wide variety of levels of sophistication, as desired.

As illustrated in FIGS. 6 and 7, the particular shape of combination swivel/slide 35 depicted herein has been chosen to insure that bridge keyways 23 and 25, as well as lock slots 30, remain covered at all times regardless of the relative position of the bridge and slide elements. This is preferred to help maintain the moving parts of assembly 15 substantially isolated from dust, dirt and grit, commonly associated with machining operations.

FIG. 3 also illustrates a plurality of machine workhead or other machine device mounting holes 50 and alternate mounting holes 51. These holes are simply illustrated as examples of a mounting configuration which could be incorporated with combination slide 35 to provide substantially universal tool or workpiece holding capabilities and application of assembly 15. For example, particular mounting holes (e.g. 50) might be required to support a workhead, such as for an internal grinding machine, while other mounting holes (e.g. 51) would be useful for mounting a workhead at a right angle to a spindle, such as for an outside grinding wheel. It is contemplated that complete workhead assemblies and loaders could be superposed upon assembly 15 as desired, and substituted as necessary without physically altering the structure of the present invention. The resulting articulated axis workslide assembly thereby provides for variable utility and multi-directional motion in a compressed structure, eliminating multiple mechanisms, enabling increased rigidity of the structure at reduced costs for manufacturing, assembly and maintenance.

Having shown and described the preferred embodiments of the present invention, further adaptions of the workslide assembly described herein can be accomplished by appropriate modifications by one of ordinary skill in the art without departing from the scope of the present invention. Several of such potential modifications have been mentioned, and others will be apparent to those skilled in the art. Accordingly, the scope of the present invention should be considered in terms of the following claims and is understood not to be limited to the details of structure and operation shown and described in the specification and drawings.

I claim:

1. An articulated axis workslide assembly comprising:
    a bridge plate having an upper surface and first and second bridge keyways, said bridge keyways oriented on said bridge plate parallel to one another along a first longitudinal axis;
    first and second bridge keys slidably mounted in said first and second bridge keyways, respectively, for reciprocation parallel to said first axis;
    a combination swivel/slide member having a lower surface, a slide keyway, and a pivot hole;
    a slide key slidably mounted in said slide keyway;
    means for slidably and pivotally connecting said bridge and swivel/slide member such that said upper surface is adjacent and facing said lower surface along a single interface plane, said connecting means comprising a rotatable attachment of said swivel/slide member adjacent said pivot hole; and
    means for selectively reciprocating said first and second keys along their respective keyways, whereby the position of said swivel/slide relative to said bridge can be precisely adjusted in separate or combined linear and pivotal directions along said interface plane.

2. The articulated axis workslide assembly of claim 1, wherein said slide key is rotatably connected to said first bridge key.

3. The articulated axis workslide assembly of claim 2, further comprising means for selectively locking said swivel/slide in a desired position relative to said bridge plate.

4. The articulated axis workslide assembly of claim 3, wherein said locking means comprises a pair of clamps which can be selectively secured to lock said swivel/slide in position.

5. The articulated axis workslide assembly of claim 4, wherein said locking means comprises a pair of clamp members a pair of parallel slots formed in said bridge plate, and a pair of arcuate slots formed in said swivel/slide, said bridge slots each corresponding with a slide slot to slidably align a clamp member extending therebetween.

6. The articulated axis workslide assembly of claim 1, wherein said means for slidably and pivotally connecting said bridge and swivel/slide member in facing relationship along said interface plane comprises a substantially frictionless bearing arrangement between said upper and lower surfaces.

7. The articulated axis workslide assembly of claim 6, wherein said frictionless bearing arrangement comprises an air lift device to support said bridge and swivel/slide member in effectively spaced face to face relationship during adjustment of the relative positions along said plane.

8. The articulated axis workslide assembly of claim 6, wherein said frictionless bearing arrangement comprises a plurality of hydrostatic bearing devices located between said bridge and slide.

9. The articulated axis workslide assembly of claim 1, wherein said means for reciprocating said first and second keys comprises a first manipulator means for simultaneously moving said bridge keys in their keyways.

10. The articulated axis workslide assembly of claim 9, further comprising a second manipulator means for enabling selective independent movement of said first bridge key in its keyway.

11. The articulated axis workslide assembly of claim 1, wherein said first and second bridge keyways each further comprise a lesser through slot to enable attachment of said bridge keys to said reciprocating 12. An articulated axis workslide assembly comprising:
    a bridge plate having an upper surface and first and second bridge keyways, said bridge keyways oriented on said bridge plate parallel to one another and to a first longitudinal axis;
    first and second bridge keys slidably mounted in said first and second bridge keyways, respectively, for reciprocation parallel to said first axis;
    a combination swivel/slide member having a lower surface, a slide keyway oriented in a non-parallel manner with respect to said bridge keyways in use, and a pivot hole;
    a slide key slidably mounted in said slide keyway;
    means for slidably and pivotally connecting and supporting said bridge and swivel/slide member such that said upper surface is
    adjacent and facing said lower surface along a single interface plane, said connecting means comprising a rotatable attachment of said swivel/slide member adjacent said pivot hole, and said slide key being rotatably connected to said first bridge key; and
    means for selectively reciprocating said first and second keys along their respective keyways, whereby the position of said swivel/slide relative to said bridge can be precisely adjusted in linear and pivotal directions along said plane.

13. The articulated axis workslide assembly of claim 12, further comprising means for selectively locking said swivel/slide in a desired position relative to said bridge plate.

14. The articulated axis workslide assembly of claim 13, wherein said locking means comprises a pair of clamps which can be selectively secured to lock said swivel/slide in position.

15. The articulated axis workslide assembly of claim 13, wherein said locking means comprises a pair of locking members, a pair of parallel slots formed in said bridge plate, and a pair of arcuate slots formed in said swivel/slide, said bridge slots each corresponding with a slide slot to slidably align a locking member extending therebetween.

16. The articulated axis workslide assembly of claim 12, wherein said means for supporting said bridge and swivel/slide member in facing relationship along said interface plane comprises a substantially frictionless bearing arrangement between said upper and lower surfaces.

17. The articulated axis workslide assembly of claim 16, wherein said means for selectively reciprocating said first and second keys further comprises a first manipulator means for simultaneously reciprocating said first and second keys within their respective keyways, and a second manipulator means for independently reciprocating said first key relative to said second key.

18. An articulated axis workslide assembly for machine tools, comprising:
- a bridge plate having an upper surface and first and second bridge keyways, said bridge keyways oriented on said bridge plate parallel to one another and to a first longitudinal axis;
- first and second bridge keys slidably mounted in said first and second bridge keyways, respectively, for reciprocation parallel to said first axis;
- a combination swivel/slide member having a lower surface, a slide keyway oriented in a non-parallel manner with respect to said bridge keyways in use, and a pivot hole; a slide key slidably mounted in said slide keyway;
- means for slidably and pivotally connecting said swivel/slide member to said bridge such that said upper surface is adjacent and facing said lower surface along a single interface plane, said connecting means comprising a rotatable attachment of said swivel/slide member adjacent said pivot hole and to said second key, and one or more anti-friction supports between said upper and lower surfaces, said slide key being rotatably connected to said first bridge key;
- means for selectively locking said slide in a desired position relative to said bridge plate; and
- means for selectively simultaneously reciprocating said first and second keys along their respective keyways, and for independently reciprocating only said first key relative to said second key, whereby the position of said swivel/slide relative to said bridge can be precisely adjusted both linearly and pivotally along said plane.

19. The articulated axis workslide assembly of claim 18, wherein said locking means comprises a pair of locking members, a pair of parallel slots formed in said bridge plate, and a pair of arcuate slots formed in said swivel/slide member, said bridge slots each corresponding with a slide slot to slidably align a locking member extending therebetween.

20. The articulated axis workslide assembly of claim 19, wherein said reciprocating means comprises a first manipulator means for simultaneously moving said first and second keys in a direction parallel to said first axis, and a second manipulator means for enabling selective independent movement of said first key relative to said second key along said first axis.

* * * * *

UNITED STATES PATENT AND TRADEMARK OFFICE
CERTIFICATE OF CORRECTION

PATENT NO. : 5,163,794

DATED : November 17, 1992

INVENTOR(S) : Ellsworth C. Enos

It is certified that error appears in the above—identified patent and that said Letters Patent is hereby corrected as shown below:

Claim 11, column 10, line 24, "means.", should be inserted after "reciprocating".

Claim 12, column 10, line 42, beginning "adjacent and facing ..." should immediately follow line 41, "that said upper surface is".

Claim 18, column 11, line 24, "a slide key slidably mounted in" should begin a new paragraph on line 25.

Signed and Sealed this

Twenty-third Day of November, 1993

Attest:

BRUCE LEHMAN

Attesting Officer     *Commissioner of Patents and Trademarks*